June 21, 1966  H. A. PARKER  3,256,860
ANIMAL ENCLOSURE
Filed Sept. 22, 1964  2 Sheets-Sheet 1
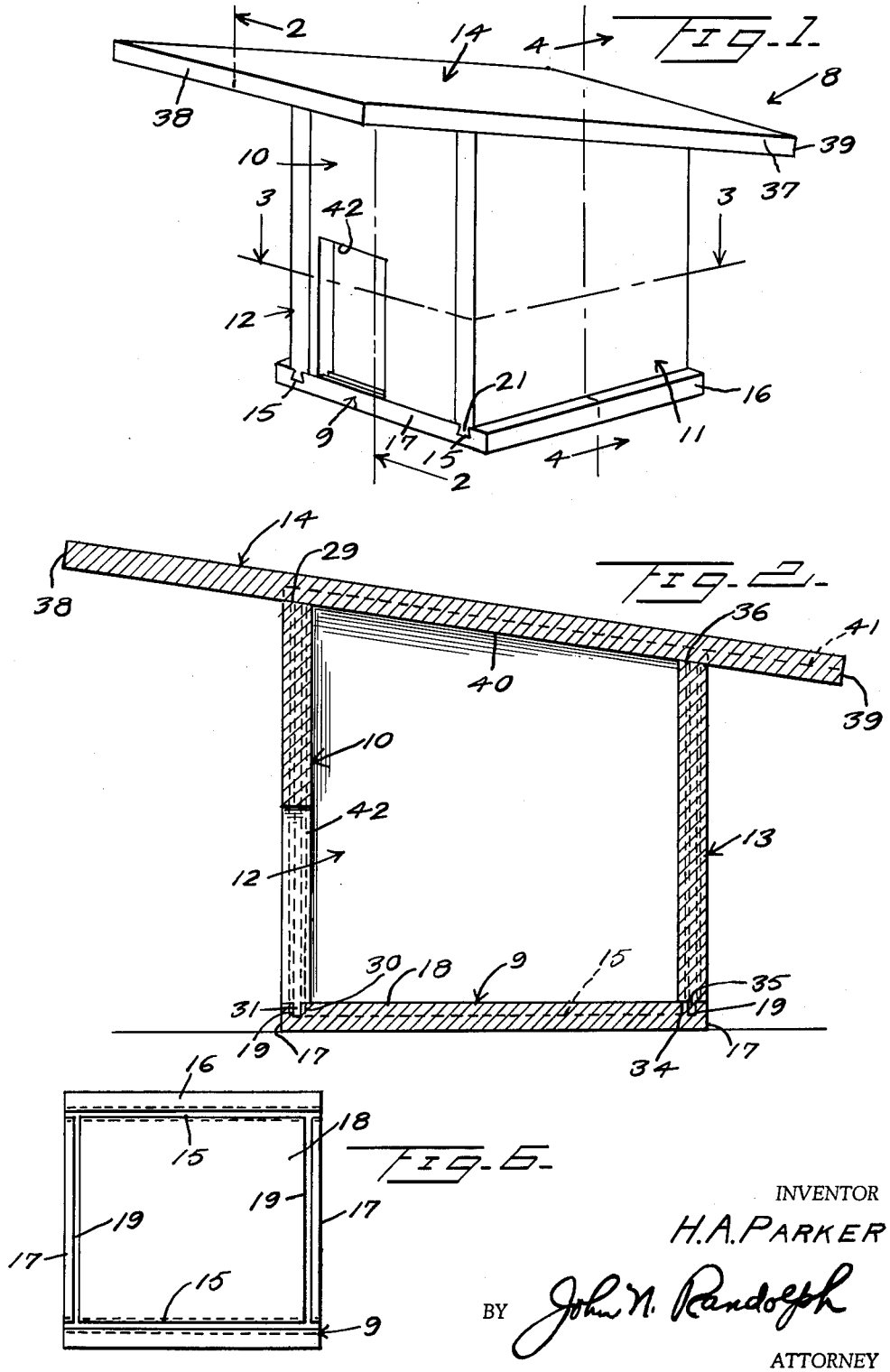
INVENTOR
H. A. PARKER
BY John N. Randolph
ATTORNEY June 21, 1966     H. A. PARKER     3,256,860
ANIMAL ENCLOSURE
Filed Sept. 22, 1964     2 Sheets-Sheet 2
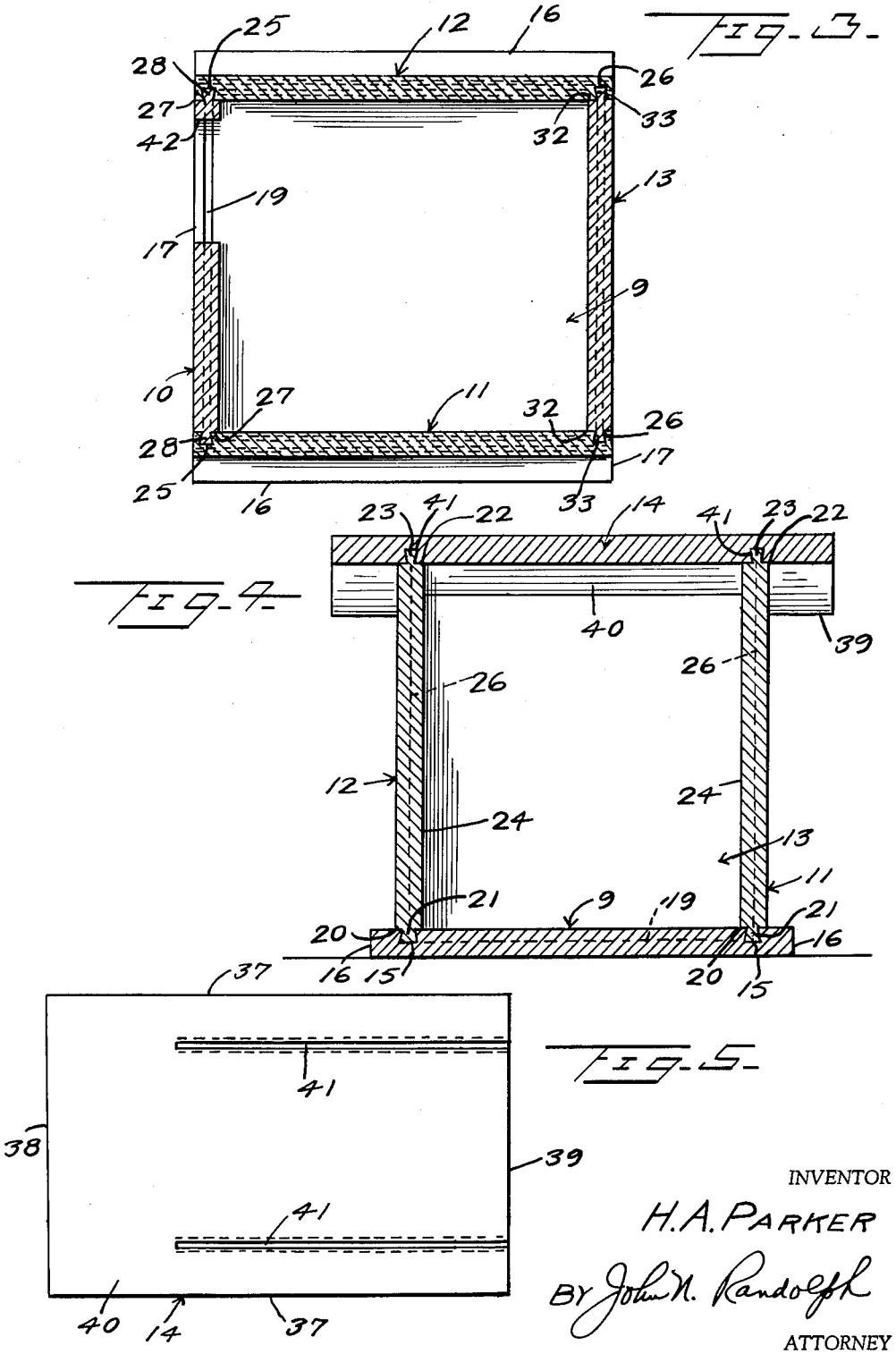
INVENTOR
H.A. PARKER
BY John N. Randolph
ATTORNEY

United States Patent Office 3,256,860
Patented June 21, 1966

3,256,860
ANIMAL ENCLOSURE
Harry A. Parker, Box 1, Langley, S.C.
Filed Sept. 22, 1964, Ser. No. 398,168
1 Claim. (Cl. 119—19)

This invention relates to a novel enclosure for small domestic animals, primarily dogs and cats, and will hereinafter be described as an enclosure for a dog, or as a doghouse.

The primary object of the present invention is to provide a doghouse composed of prefabricated parts which may be readily assembled or dismantled to enable the doghouse to be most conveniently stored or handled for transportation.

A further object of the invention is to provide an enclosure or doghouse requiring no fastenings for assembling the enclosure and including interlocking means for effectively interlocking the parts of the house or enclosure when assembled.

Still another object of the invention is to provide an enclosure formed of six substantially flat panel members.

Various other objects and advantages of the invention will hereinafter become more fully apparent from the following description of the drawings, illustrating a presently preferred embodiment thereof, and wherein:

FIGURE 1 is a perspective view looking toward the front and one side of the animal enclosure;

FIGURE 2 is an enlarged vertical sectional view taken substantially along a plane as indicated by the line 2—2 of FIGURE 1;

FIGURE 3 is an enlarged horizontal sectional view taken substantially along a plane as indicated by the line 3—3 of FIGURE 1;

FIGURE 4 is an enlarged transverse sectional view taken substantially along a plane as indicated by the line 4—4 of FIGURE 1;

FIGURE 5 is a bottom plan view of the roof member of the enclosure, and

FIGURE 6 is a top plan view of the floor member of the enclosure.

Referring more specifically to the drawings, the animal enclosure or doghouse is designated generally 8 and is composed entirely of six flat panel members or boards 9, 10, 11, 12, 13, and 14. Said panel members may be formed of any suitable material of sufficient thickness and density to be grooved, and which is preferably relatively light in weight.

The panel member 9, as best seen in FIGURE 6, constitutes a base or floor member of the enclosure 8 and is provided with two parallel grooves 15 which are disposed adjacent to and spaced from opposite side edges 16 thereof and which extend between and open through the other side edges 17 of the floor 9. The grooves 15 are of dovetail shape in cross section, as seen in FIGURES 1 and 4. The upper side 18 of the floor 9 is also provided with grooves 19 which are disposed adjacent and parallel to the edges 17 and the ends of which open into the grooves 15. The grooves 19 have straight sides, as seen in FIGURE 2.

The side walls 11 and 12 have straight bottom edges 20. The edges 20 have depending tongues 21 extending from end-to-end thereof. The side walls 11 and 12 have corresponding inclined top edges 22 each of which has an upstanding tongue 23 which extends from end-to-end thereof. The tongues 21 and 23 are of dovetail shape in cross section, as seen in FIGURE 4. The bottom tongues 21 are applied endwise through the grooves 15 for mounting the side walls 11 and 12 in upright positions on the floor 9. The side walls are of a length to extend between the edges 17, as seen in FIGURE 3, and are spaced slightly inwardly from the edges 16. The adjacent inner sides 24 of the walls 11 and 12 are provided with dovetail grooves 25 and 26, which extend between the bottom edges 20 and the top edges 22. The grooves 25 are disposed adjacent the wider or front ends of the walls 11 and 12 to register with the ends of one of the grooves 19, while the grooves 26 which are disposed adjacent the narrow ends of the walls 11 and 12 register with the ends of the other groove 19.

The front wall 10 has side edges 27 each of which is provided with a tongue 28 which extends from top-to-bottom thereof, and which tongues are of dovetail shape in cross section. The tongues 28 are inserted downwardly into the grooves 25 to position the edges 27 between and in abutting engagement with the inner sides 24 of the walls 11 and 12, adjacent their wider ends. The heighth of the front wall 10 corresponds to the heighth of the forward ends of the side walls 11 and 12. The front wall 10 has a transversely inclined upper edge 29 which is disposed in the same plane as the upper edges 22 of the side walls. A bottom edge 30 of the front wall 10 rests on the top surface 18 of the floor 9. Said bottom edge 30 has a depending longitudinal extending tongue 31 which has straight sides so that the tongue 31 can move downwardly into one of the grooves 19, as the front wall is displaced downwardly between the side walls 11 and 12.

As seen in FIGURE 2, the rear wall 13 is of a heighth less than the height of the front wall 10 and corresponding to the height of the rear ends of the side walls 11 and 12. The side edges 32 (FIGURE 3) of the rear wall have tongues 33 extending from end-to-end thereof which are inserted downwardly into the grooves 26 and which are of dovetail shape in cross section, for interlocking engagement in said grooves 26. The bottom edge 34 of the rear wall 13 has a tongue 35 extending from end-to-end thereof, corresponding with the tongue 31, which engages in the other groove 19. It will be readily apparent that the side walls 11 and 12 will be locked in engagement with the floor 9 when either the front wall 10 or the rear wall 13 is applied, since each of these walls is connected by tongue and groove connections with the side walls and by tongue and groove connection to the floor 9. The upper edge 36 of the rear wall 13 is inclined transversely in the same manner as the edge 29 to be disposed in the same plane as the edges 22 and 29 when the bottom edge 34 is resting on the floor surface 18.

The roof panel 14 is of a width between its side edges 37 preferably greater than the width of the floor 9 as measured between its edges 16, as seen in FIGURE 4, and is of a length as measured between its ends 38 and 39 substantially greater than the space between the other edges 17 of the floor 9, one of which constitutes the front edge and the other the rear edge thereof. An underside 40 of the roof 14 is provided with two parallel dovetail grooves 41 which extend from points spaced from the end 38 and which open through the other rear end 39. The grooves 41 are spaced equal distances from the side edges 37 and are spaced apart a distance corresponding to the space between the grooves 15. The rear end 39, with the underside 40 of the roof facing downwardly, is moved rearwardly toward the forward ends of the tongues 23 so that said tongues are received in the grooves 41 through their open rear ends. The roof 14 is then displaced rearwardly until the forward ends of the tongues 23 abut the forward ends of the grooves 41, for attaching the roof 14 to the side walls 11 and 12, to complete the assembly of the enclosure 8.

As seen in FIGURE 2, the grooves 41 are longer than the side walls 11 and 12 so that the rear end 39 of the roof is disposed behind and spaced from the rear wall 13 to provide a rear eave or overhang, and the forward end 38 is spaced a greater distance from the front wall 10 to provide a front eave or overhang. As seen in FIGURE 4, the side edges 37 are spaced outwardly from the side walls 11 and 12. It will also be apparent that a part of the underside 40 of the roof will abut against the upper edges 29 and 36 of the front wall 10 and rear wall 13, respectively, for holding said walls against upwardly placement while the roof 14 is applied.

The front wall 10 is shown provided with an entrance and exit opening 42, which opening may be of any desired size or shape depending upon the animal that will occupy the enclosure.

From the foregoing it will be apparent that the enclosure 8 can be assembled from the six prefabricated panels 9-14, without the use of tools or fastenings. It will also be apparent that the enclosure 8 may readily be dismantled by first displacing the roof 14 forwardly until its grooves 41 disengage the tongues 23, after which the front wall 10 and rear wall 13 can be moved upwardly and disengaged from the floor 9 and the side walls 11 and 12, after which said walls can be displaced forwardly or rearwardly and disengaged from the floor 9. The six prefabricated panel members 9-14 may then be readily stacked one upon the other as a compact bundle for storage or transportation. It will also be apparent that the enclosure may be made in various sizes and may be made rectangular rather than substantially square as illustrated.

Various other modifications and changes are contemplated and may be resorted to without departing from the function or scope of the invention, as hereinafter defined by the appended claim.

I claim as my invention:

An animal enclosure consisting of a board forming a floor having an upper side provided with parallel grooves extending between and opening through opposite edges thereof, two boards forming side walls having bottom edges provided with integral tongues engaging in said grooves for mounting the side walls in upright positions on the floor, said tongues and grooves being of dovetail shape in cross section, said side walls having inner faces provided with grooves extending between top and bottom edges thereof, two boards forming end walls having side edges provided with integral tongues engaging the grooves of said side walls, the upper side of said floor having parallel grooves extending between said first mentioned grooves, said end walls having bottom edges provided with integral tongues engaging said last mentioned grooves for retaining said side walls immovable relative to the floor, said side walls having upper edges provided with integral tongues, a board forming a roof having an under side provided with parallel grooves therein opening through one edge thereof and engaging said last mentioned tongues, said last mentioned tongue and grooves being of dovetail shape in cross section, and said roof engaging upper edges of said end walls for retaining the tongues of the bottom edges of said end walls in engagement with the last mentioned grooves of said floor.

References Cited by the Examiner

UNITED STATES PATENTS 2,410,221   10/1946   Latura _____ 119—19 X

SAMUEL KOREN, *Primary Examiner.*

HUGH R. CHAMBLEE, *Examiner.*